United States Patent
Moturu et al.

(10) Patent No.: US 10,162,624 B1
(45) Date of Patent: Dec. 25, 2018

(54) WEB SHELL FOR DYNAMICALLY GENERATED CROSS-PLATFORM APPLICATIONS

(71) Applicant: INTUIT INC., Mountain View, CA (US)

(72) Inventors: Tapasvi Moturu, Mountain View, CA (US); Anshu Verma, Mountain View, CA (US); Muzaffar H. Malik, Mountain View, CA (US); Jeffery Brewer, Mountain View, CA (US); Dante C. Mostajo, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/844,337

(22) Filed: Dec. 15, 2017

(51) Int. Cl.
 *G06F 9/451* (2018.01)
 *G06F 8/65* (2018.01)
(52) U.S. Cl.
 CPC ............. *G06F 8/65* (2013.01); *G06F 9/451* (2018.02)
(58) Field of Classification Search
 None
 See application file for complete search history.

(56) References Cited

U.S. PATENT DOCUMENTS

| 10,096,022 | B2* | 10/2018 | Gupta | G06Q 20/382 |
| 2009/0070162 | A1* | 3/2009 | Leonelli | G06Q 10/06 705/7.27 |
| 2012/0198457 | A1* | 8/2012 | Leonelli | G06F 8/34 718/102 |
| 2013/0054812 | A1* | 2/2013 | DeCoteau | H04W 4/50 709/226 |
| 2013/0151417 | A1* | 6/2013 | Gupta | G06Q 20/382 705/65 |
| 2016/0004565 | A1* | 1/2016 | Harper | G06F 9/4881 718/102 |
| 2017/0344921 | A1* | 11/2017 | Leonelli | G06Q 10/06311 |

* cited by examiner

*Primary Examiner* — Philip Wang
(74) *Attorney, Agent, or Firm* — Patterson + Sheridan, LLP

(57) ABSTRACT

This disclosure generally relates to executing dynamically generated applications in a web browser-based shell. An exemplary method generally includes instantiating shared components in the browser-based shell, the shared components exposing a common runtime environment to widgets loaded into the browser-based shell. A first workflow definition representing a first step of a workflow is received. The first workflow definition specifies first widgets, comprising modular components that perform functions represented by the first step of the workflow and comprising a user interface definition, to be loaded into the browser-based shell. The first widgets are obtained from one or more of a remote source, a local cache, or a temporary memory and loaded into the browser-based shell. A user interface is generated according to the first workflow definition to exposes the function to a user which, when invoked, initiates a transition to a second step of the workflow.

20 Claims, 8 Drawing Sheets

WEB SHELL FOR DYNAMICALLY GENERATED CROSS-PLATFORM APPLICATIONS

BACKGROUND

Field

Aspects of the present disclosure generally relate to techniques for deploying software applications, and more specifically to deploying software applications with user interfaces decoupled from application logic in a web-based shell.

Description of the Related Art

Software applications can be consumed on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths which include code for generating a user interface and application logic tightly bound to the application logic. In some cases, applications targeting a common platform do not work on every device implementing the common platform, resulting in developers having to write application logic that accommodates different devices on the common platform.

As the number of applications targeting different platforms and applications supporting variations on a common workflow increases, the difficulty in providing a different version of the same application for each device increases. For example, a set of tax preparation applications perform the same general task of preparing a user's taxes, but a variety of discrete software artifacts may exist for variations on the workflow (e.g., one artifact may execute a workflow for preparing a simple tax return for a taxpayer in the United States, another artifact may execute a workflow for preparing a complex tax return for a taxpayer in the United States, another artifact may execute a workflow for preparing a simple tax return in Canada, and the like). While these applications may perform the same general task (e.g., of tax preparation) and may share a significant amount of code, each application may also implement custom code dedicated to performing a task according to each device.

Because these applications may implement a combination of custom and shared application logic that is bound to the user interface of the application, building and maintaining these applications generally requires large amounts of developer time. For example, if a common code component is modified, development teams may need to verify that the modification to the common code component does not adversely affect the operation of applications that use the common code component (e.g., render custom code components in a specific application unusable or otherwise modify the functionality of the custom code components). Further, as new variants of a workflow are identified, additional applications may be built, which adds to the universe of applications to be maintained.

Therefore, there is a need for systems that reduce the amount of time needed to develop, update, and deploy applications across different computing platforms.

SUMMARY

One embodiment of the present disclosure includes a method for executing a cross-platform application in a web browser-based shell. The method generally includes instantiating one or more shared components in the browser-based shell, the one or more shared components exposing a common runtime environment to widgets loaded into the browser-based shell. An application orchestration engine receives, from an application server, a first workflow definition representing a first step of a workflow. The first workflow definition generally specifies first widgets to be loaded into the browser-based shell. The first widgets generally comprise modular components that each perform a function represented by the first step of the workflow, and each widget comprises a user interface definition. The orchestration engine obtains, from one or more of a remote source, a local cache, or a temporary memory, the first widgets and loads the first widgets into the browser-base shell. The orchestration engine generates a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

Another embodiment of the present disclosure includes a processor and a memory storing a program, which, when executed on the processor, performs an operation for executing a cross-platform application in a web browser-based shell. The operation generally includes instantiating one or more shared components in the browser-based shell, the one or more shared components exposing a common runtime environment to widgets loaded into the browser-based shell. An application orchestration engine receives, from an application server, a first workflow definition representing a first step of a workflow. The first workflow definition generally specifies first widgets to be loaded into the browser-based shell. The first widgets generally comprise modular components that each perform a function represented by the first step of the workflow, and each widget comprises a user interface definition. The orchestration engine obtains, from one or more of a remote source, a local cache, or a temporary memory, the first widgets and loads the first widgets into the browser-base shell. The orchestration engine generates a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

Still another embodiment of the present disclosure provides a system for executing a cross-platform application in a web browser-based shell. The system generally includes a plurality of shared components that expose a common runtime environment to widgets loaded in the browser-based shell. The system generally also includes an orchestration engine. The orchestration engine generally instantiating one or more shared components in the browser-based shell, the one or more shared components exposing a common runtime environment to widgets loaded into the browser-based shell. An application orchestration engine receives, from an application server, a first workflow definition representing a first step of a workflow. The first workflow definition generally specifies first widgets to be loaded into the browser-based shell. The first widgets generally comprise modular components that each perform a function represented by the first step of the workflow, and each widget comprises a user interface definition. The orchestration engine obtains, from one or more of a remote source, a local cache, or a temporary memory, the first widgets and loads the first widgets into the browser-base shell. The orchestration engine generates a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
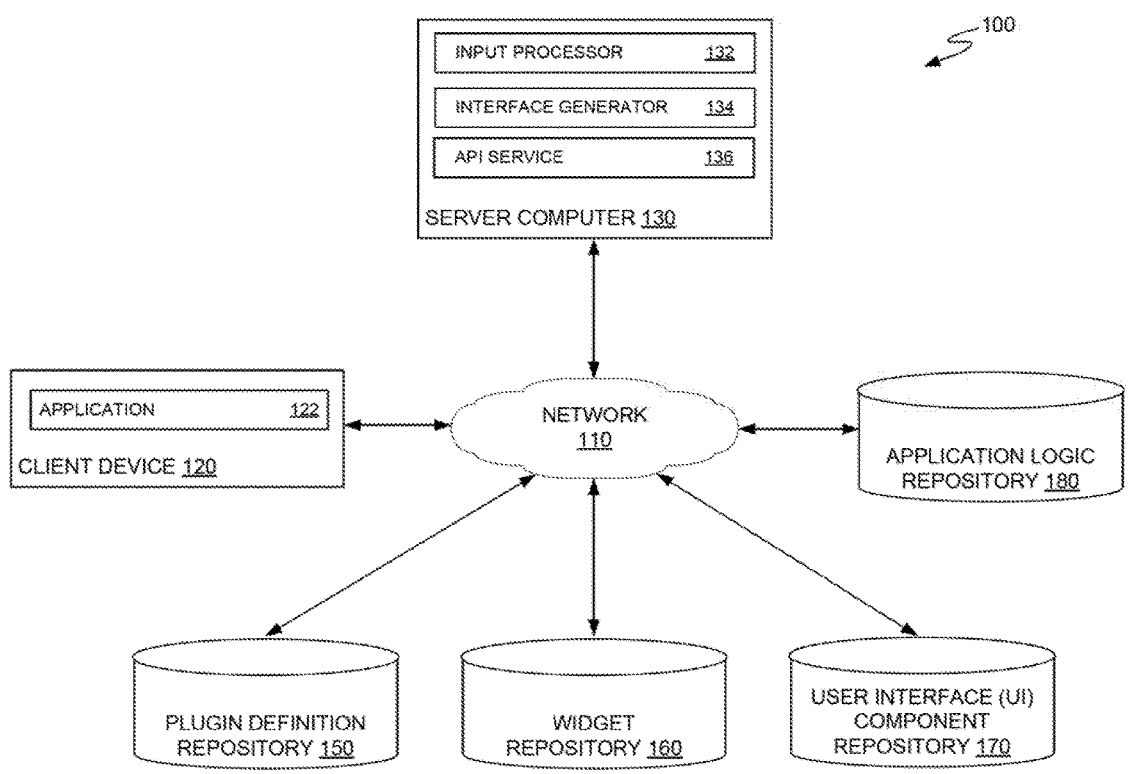
FIG. 1 illustrates an exemplary computing system in which user interfaces are dynamically generated and deployed to client devices executing a cross-platform application, according to one embodiment.

To reduce the amount of code to be maintained in a universe of related applications, software applications may be developed using a "write once, run anywhere" development paradigm. In some cases, a "write once, run anywhere" development paradigm may entail the creation of web applications that execute in a web browser. Because these web applications can execute in a web browser, these applications are generally able to execute on any device that includes a web browser, such as a desktop computer, laptop computer, tablet, smartphone, handheld computer, etc. However, these web applications are generally written as code monoliths, which limits the amount of code that can be reused across different platforms. Further, in some cases, different variations of a workflow and/or different usability constraints for different types of devices (e.g., different user interfaces for desktop, web, and mobile applications, different capabilities of different types of devices, and the like) may prompt the creation of different code monoliths for these different types of devices. For example, one version of a web application may be created for traditional desktop and laptop computers, and a different version of the same web application may be created for mobile devices and may be configured to accommodate the smaller screens and higher spatial resolution of mobile devices relative to traditional computers. However, because different software artifacts are generated for different types of devices, developers may still need to debug a multitude of different software artifacts when changes are propagated to shared portions of application code. Further, the generation of different software artifacts for different types of devices generally limits the amount of code reuse that can be accomplished for a given application.

Aspects of the present disclosure generally provide a web browser-based shell in which cross-platform applications can be executed. The cross-platform applications executed within the web browser-based shell may include a plurality of widgets for each step of a workflow, and the widgets loaded into the web browser-based shell may change as a user progresses through the workflow. By implementing cross-platform applications as a collection of widgets that can be reused across different platforms, cross-platform applications can decouple user interface components and application logic from one another. These widgets can be reused across different devices and, in some cases, can be used to deliver applications in a web page or within native applications through an embedded web browser, which reduces the number of discrete software artifacts that need to be maintained, updated, and debugged.

Because user interfaces and application are decoupled, changes made to application logic generally do not affect the definition and operation of a user interface. Conversely, changes to a user interface generally do not affect application logic invoked by the user interface. More generally, decoupling application logic from user interfaces allows mobile, web, and desktop applications to be deployed using a single code base. Further, because user interfaces and application logic are decoupled, modifications to either or both a user interface or application logic can be tested and deployed quickly and with a limited amount of testing, as changes to one generally do not affect the other.

FIG. 1 illustrates an exemplary computing system. As illustrated, computing system 100 includes a client device 120, a server computer 130, a plugin definition repository 150, a widget repository 160, a user interface (UI) component repository 170, and an application logic repository 180, connected via network 110.

Client device 120 may be any sort of computing device, such as a desktop computer, a laptop computer, a tablet computer, a smartphone, or the like. Client device 120 may execute an application 122 that communicates with the server computer 130 to obtain a user interface for the application 122 and provide data to the server computer 130 for processing. In one example, the application 122 executes a multi-step workflow where each step of the workflow is displayed as a set of interface components that are built dynamically based, at least in part, on the platform (e.g., type of device and operating system) and the current state of the application (e.g., a progress state of a workflow).

In some cases, a user interface definition may include native user interface elements, which may be specific to a platform, as well as web-based user interface elements which may be shared across different platforms and allow for a common user interface to be generated across multiple platforms. In one embodiment, the collection of user interface elements may be selected based on a particular platform as well as an application state, such as a progress state of a workflow. For example, a user interface definition for a step of a tax preparation workflow could include a combination of web-based user interface elements used to manually add form data along with native user interface components that allow the application 122 to capture and process data from a camera at the client device 120. The web-based and native user interface components may be stored in the user interface component repository 170. In another portion of the tax preparation workflow, where a user is asked to identify deductions the user is entitled to claim, the user interface definition may identify a number of web-based user interface elements from the user interface component repository 170 to render in the application 122.

In some embodiments, native code components may also be included in a user interface definition to take advantage of functionality exposed by the operating system executing on the client device 120. For example, native code components may be referenced in a user interface definition that generates notifications related to the application 122. In other examples, native code components can be referenced in a user interface definition to allow users to provide voice data into the application 122, engage in video chats with other users or with live support representatives using the application 122, etc. Further, native code components may be referenced in a user interface definition to enable a user to take advantage of input methods and technologies particular to a platform, such as a multi-touch and/or pressure-sensitive touchscreen display, etc.

As a user interacts with the application 122, the application 122 may transmit user-provided data and context information to the server computer 130 for processing. The context information may include device information (e.g., the type of device, the operating system in which the application 122 is being executed on the client device 120, capabilities of the device, and the like) and application state information. The application state information may include the current version of a user interface definition (e.g., widget definitions and/or updated rules for processing user-provided data) for a specific step of a workflow cached at the client device 120, the current step of the workflow executing in the application 122 (i.e., a progress state of the workflow), and a variation of the application a user is executing (e.g., the version of the application specific to a geographical region in which the client device 120 hosting the application 122 is located). When a user submits data to the server computer 130, the application 122 may invoke a specific function in the user interface definition according to the data elements specified as inputs to the specific function. In response to transmitting data to the server computer 130, the application 122 may receive a new user interface definition identifying the present step of the workflow, the user interface elements to be displayed on the client device 120, and the function(s) to be invoked upon completion of data entry for the present step of the workflow.

The server computer 130 may receive user input from the client device 120 and generates a user interface definition for the client device to display user interface elements for the next step of a workflow based on the received user input. As illustrated in FIG. 1, the server computer 130 includes an input processor 132, an interface generator 134, and an API service 136. While the server computer 130 is depicted as a single server in FIG. 1, in other embodiments the functions of the server computer 130 (e.g., functions of the input processor 132, the interface generator 134, and the API service 136) may be implemented on more than one server, such as an application server and a gateway server (not shown in FIG. 1).

The input processor 132 may receive user-provided data from the application 122 (e.g., form input), an indication of the next step to be performed in a workflow executing in the application 122, and other context information from the client device 120 for processing. The input processor 132 generally invokes one or more functions exposed by the API service 136 and identified in the user-provided data. The input processor 132 examines any other data provided by the client device 120 to generate a user interface definition for the client device 120 including one or more plugins from the plugin definition repository 150.

A plugin may include a collection of widgets that the client device 120 and/or the server computer 130 can use to represent a discrete task. A plugin may reference one or more functions defined in the API service 136 that are invoked to complete the discrete task. Each widget may define a collection of user interface elements to render on the client device 120 to complete a workflow step or to enable a user to input data into the application 122. The plugin may identify included widgets, functions the plugin can invoke in the API service 136, permissions associated with the plugin, behaviors of the plugin, intended interactions with other parts of a service, such as API service 136, and the like. Each plugin may be versioned as the widget definitions and/or application logic associated with a plugin is updated.

In some cases, the input processor 132 may receive information about the current version of a user interface definition associated with a plugin cached at the client device 120. If the input processor 132 determines the current version of the plugin in the plugin definition repository 150 matches the version of the plugin cached at the client device 120, the input processor 132 can indicate to the client device 120 to render the user interface associated with the next step in the workflow using the cached version. Because the cached version of the user interface definition at client device 120 is the most current version of the user interface definition, input processor 132 need not invoke the interface generator 134 to generate an updated user interface definition for the step of the workflow to be displayed on the client device 120.

If, however, the input processor 132 determines that the current version of the user interface definition cached at the client device 120 is outdated or that no user interface definition for the requested step of the workflow exists at the client device 120, input processor can invoke the interface generator 134 to generate the user interface definition for the requested step of the workflow. In some cases, the input processor 132 may invoke the interface generator 134 with information identifying the requested step of the workflow and device-specific information (e.g., device type, operating system, whether the application is a native application or is executing in a web-based shell, and other device-specific information).

The interface generator 134 may generate a user interface definition using the information received from the client device 120 and transmit the user interface definition to the client device 120 for rendering and execution by the application 122. To generate the user interface definition, the interface generator 134 uses the information identifying the requested step of the workflow and the context information to identify one or more plugins to select for populating the user interface definition. The interface generator 134 may populate the user interface definition according to a defined order in which the widgets associated with the one or more plugins are to be displayed to a user and transmit the user interface definition to the client device 120. The interface generator 134 may generate a user interface definition referencing web-based user interface components (i.e., not native), user interface components shared across different platforms, user interface components belonging to a specific platform (i.e., native interface components), or a combination thereof. The user interface definition may additionally reference one or more functions that can be invoked by the generated user interface. These functions may commit data to one or more data stores associated with the application 122, transmit data to the server computer 130 for processing, or route user-provided data to one or more expert systems on the server computer 130 for analysis (e.g., to guide a user through a workflow).

Because the user interface definition references one or more functions that can be executed through the generated user interface, but generally does not include the code for executing the one or more functions, the server computer 130 allows for the decoupling of a user interface and the application logic for performing a task. Thus, a user generally receives a user interface definition that is platform specific, i.e., customized for the client device on which the user is executing the application 122. The user interface definition interacts with underlying application logic (e.g., stored in application logic repository 180) that may be implemented as a single code base maintained independently from platform-specific code. Common application components need not be duplicated, updated, and tested for platform-specific versions of the same application. Changes in application logic (e.g., to support new variations of a workflow, to modify how data is processed at a specific step in a workflow, and the like) generally do not affect the functionality of a generated user interface, and updated application logic may be executed by client devices without building discrete software artifacts with the updated application logic.

For example, suppose that the application 122 is a tax preparation application executing on a client device 122 and that the user of the client device 120 is attempting to provide wage income data to the application 122. The interface generator 134 may identify multiple plugins that can be executed on the client device 120 to allow a user to import wage income data into the application 122. For example, one plugin may allow a user to capture one or more images of a document (e.g., as still images or a live stream from a camera integrated into or otherwise connected to the client device 120) and provide the data extracted from the document to the API service 136. Because this plugin interfaces directly with device-specific capabilities, this plugin may include references to device-specific (i.e., native) logic and user interface elements tied to image capture and data extraction. Meanwhile, another plugin may generate a form used to input data. The interface generator 134 may generate a user interface definition including references to both the image capture plugin (with the native code components needed to interact with the device-specific functionality) and the form entry plugin (with a form layout definition for the one or more data entry boxes to be displayed to the user) and transmit the user interface definition to the client device 120 for execution.

In another example, suppose that the application 122 is an accounting application executing on the client device 120 and that a user of the client device 120 is entering information from paper invoices into an accounts payable or accounts receivable account in the accounting application. The application 122 can reuse the image capture plugin discussed above. In conjunction with other plugins for extracting workflow-specific data from a captured image of a document, the application 122 can extract relevant data from the captured image and provide the relevant data to the server computer 130 hosting the API service 136 for performing accounting tasks.

Another benefit of decoupling the user interface and the application logic is the ability to allow a user to move between devices running an application (e.g., 122) while executing a workflow. For example, a user may begin a workflow (e.g., a tax preparation) on one device that receives a device-specific user interface (e.g., a smartphone) and later finish the workflow on another device, such as a desktop computer. Because the application logic is not tied to the particular platform, the application logic may be deployed dynamically to different types of devices through platform-specific user interfaces and enable a user to leverage the application logic in a more flexible fashion.

The server computer 130 may host application logic for a specific application and an application programming interface (API) service 136 that allows the application 122 to invoke the functionality of the application hosted on the server computer 130. When the API service 136 receives a query from a client device 120, the API service 136 can verify that the received query is valid. If the API service 136 determines that the received query is valid, the API service 136 invokes the function specified in the query.

The plugin definition repository 150 generally stores plugin definitions for specific tasks implemented in a workflow. A plugin definition may reference one or more widgets defined in the widget repository 160 and one or more functions exposed by the API service 136 and stored in the application logic repository 180. The widgets may define a layout of a user interface to be rendered on client device 120 and include a plurality of user interface components. As discussed above, the widgets may include common user interface components, native user interface components, or a combination of common and native user interface components. Widgets that do not depend on platform-specific functionality may be defined using common user interface components, while widgets that implement device-specific functionality, such as image capture, audio capture, notification generation, and other device-specific functions, may use native (platform-specific) user interface elements linked to native application logic. In some examples, plugin definition repository 150 may be a versioned repository, and plugin version data may be updated as the configuration of a plugin (e.g., widgets used by the plugin, functions referenced by the plugin, and the like) changes.

Widget repository 160 may store data defining widgets that can be included in one or more plugins defined in plugin definition repository 150. Each widget stored in widget repository 160 may be defined as a set of user interface components configured to perform a specific task. For example, widgets may include components for performing image processing or audio processing on a client device 120, components for obtaining data entry from a user through a data entry form, and the like. Widgets that do not depend on platform-specific functionality are non-native widgets. These widgets may be platform-agnostic and may include web-based widgets or framework-based widgets. A native widget may be built using code components that are native to the platform. A platform-agnostic widget, for example, may be built using web-based code components that can be executed by a web browser (e.g., web widgets) or using cross-device framework-based code components that can be executed in a framework-based runtime environment (e.g., framework-based widgets).

User interface component repository 170 generally stores data defining common user interface components that may be used by one or more widgets to display a user interface on client device 120. In some cases, user interface component repository 170 may store user interface components that can be used across different computing platforms (i.e., platform-agnostic components) and user interface components that may be specific to a particular platform (e.g., user interface components corresponding to functionalities of a particular type of device running a particular operating system). As discussed, a user interface definition generated by interface generator 134 may include data identifying the plurality of user interface components to be displayed on client device 120, and client device 120 can retrieve the identified user interface components from user interface component repository 170 or from user interface components deployed on the client device 120 based on whether the user interface components are platform-agnostic or platform-specific functionality.

Application logic repository 180 may provide a versioned repository containing code contracts and other software artifacts for the functional code implementing the workflow processed by the server computer 130 and displayed on the client device 120. The code contracts stored in application logic repository 180 may be associated with one or more functions that a user can invoke through interaction with the one or more user interface components specified in a user interface definition and associated with a plugin associated with a step in the workflow. Each code contract may define, for example, the name of a function that a user can invoke, the required inputs for the function, optional inputs that may be, but are not required to be, provided in an invocation of the function, and the output generated by the function. The other software artifacts may further describe the one or more functions that a user can invoke, such as the functional code implementing the workflow. Server computer 130 may store application logic in the application logic repository 180 and retrieve application logic from the application logic repository 180.

Figure 2:
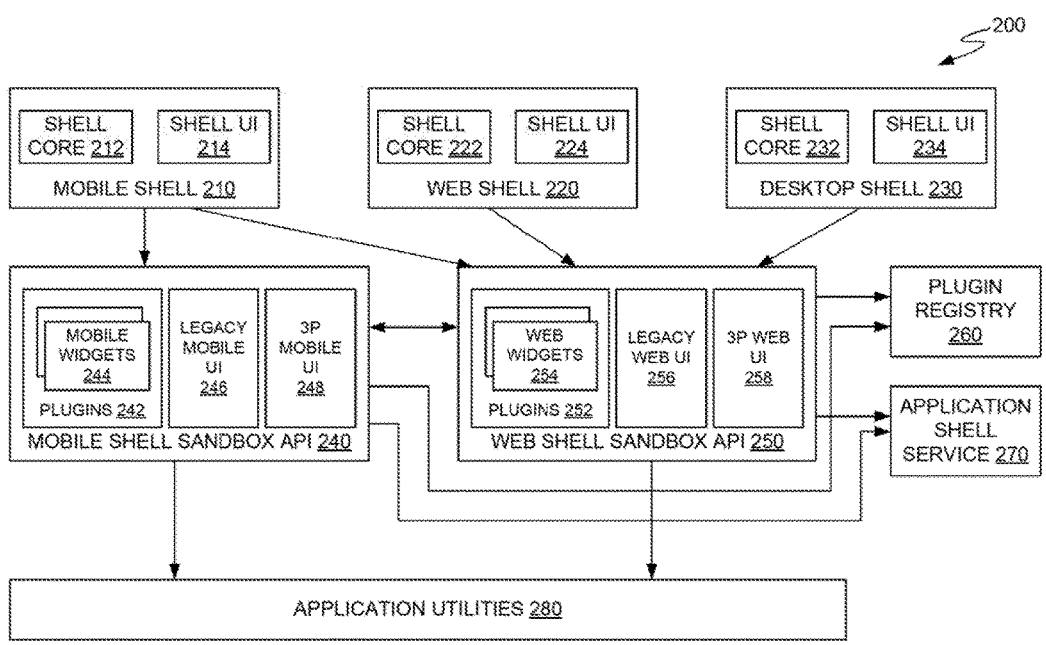
FIG. 2 illustrates an exemplary architecture in which user interfaces are dynamically generated and deployed to client devices executing a cross-platform application, according to one embodiment.

FIG. 2 illustrates an exemplary system architecture 200 for dynamically generating and deploying user interfaces in cross-platform applications, according to an embodiment. While the description of FIG. 2 focuses on web widgets as a non-native type of widget, the same concepts apply to other non-native widgets such as framework-based widgets.

As illustrated, system architecture 200 generally includes a native mobile shell 210, a web shell 220, and a native desktop shell 230, each of which may communicate with one or more shell sandbox APIs, such as the mobile shell sandbox API 240 and the web shell sandbox API 250, to access application utilities and other capabilities provided by a shell runtime, as discussed in further detail herein.

Each shell 210, 220, and 230 may allow for the dynamic generation of customized user interfaces and user experiences for applications executing on top of the shell. Each shell may be made available (e.g., via one or more data repositories) as a library that may be semantically versioned (e.g., versioned using a three part version number, such as 1.2.3, representing a major version, a minor version and a patch, respectively). Native mobile applications may consume the mobile shell 210 as a library and package the mobile shell 210 as part of the application. The web shell 220, however, may be hosted by an application server, such as server computer 130 in FIG. 1, for a specific software product and may be deployed such that applications and widgets built on the web shell 220 are continually integrated and updated. In some aspects, the native desktop shell 230 may use similar components as the web shell 220, because the native desktop shell 230 may be configured to encapsulate a web interface to deliver a software product to a user.

The shells 210, 220, and 230 may use consistent application programming interfaces (APIs) across platforms. While the implementation of API functions may differ between the mobile shell 210, the web shell 220, and the desktop shell 230, the APIs may be defined according to consistent code contracts that define required inputs, optional inputs, and required outputs for each function exposed by the API. The inputs and outputs may be defined, for example, as a variable name and a variable type indicating a data type associated with each named variable to be provided as input into a function or generated as an output by the function. To promote code reuse across the shells 210, 220, and 230, cross-platform code (e.g., code written in JavaScript, PHP, or other languages that can be executed in various computing environments with similar execution results) may be used to implement the shells 210, 220, and 230. In some aspects, each of the shells 210, 220, and 230 may include functionality tailored to the unique capabilities of each platform (e.g., a particular device type, a particular operating system, or both). For example, because mobile devices may have less computing power than desktop computers, laptop computers, or cloud computer farms on which an application may be executed, the mobile shell 210 may additionally include support for hydrating a platform-agnostic widget so that the hydrated data may be stored in memory, but not loaded into an object until the object is to be used.

Each shell 210, 220, and 230 may allow for the creation of dynamic user interfaces and user experiences customized for a particular user by combining native and non-native UI components from a variety of relevant plugins, as discussed above. The plugins selected by a shell 210, 220, or 230 may be selected based on the context in which a user is executing the application 122 (e.g., a step in a workflow that the user is currently executing, the next step in the workflow that the user may be expected to execute, and so on) and, in some embodiments, the platform on which the user is executing the application 122.

In some aspects, plugins 242 and 252 may be modular, self-contained software components of an application that expose specific features of the application. Examples of plugins may include navigation bars that allow a user to move between different steps of a workflow executed within the application 122, progress bars that display an amount of the workflow that a user has completed (and correspondingly an amount of the workflow that remains to be completed), application-specific features, features that leverage hardware present on the computing device on which the application 122 is executing (e.g., image capture using one or more cameras integrated into a client device 120, authentication using one or more biometric data capture devices integrated into a client device 120, etc.), and so on. Because each plugin may be self-contained, applications may be decomposed into a plurality of independently maintainable components (i.e., independently debugged, updated, extended, etc.).

Each plugin (e.g., 242 or 252) may include two parts: a configuration and one or more of user interface widgets. The configuration generally identifies the user interface widgets included in the plugin, a code contract, permissions, the behavior of the plugin, and intended interactions with other widgets or an application (e.g., application 122 in FIG. 1). In some embodiments, legacy code components (e.g., native code components that were created for previous versions of a software product and are intended to be reused in a cross-platform application) and third party components (e.g., extensions to an application) may be included in a plugin to be compatible with the platform. The user interfaces associated with legacy components or third party components may be implemented as a widget that can be loaded into a shell 210, 220, and/or 230 via a widget shim layer.

Each plugin (e.g., 242 and 252) and widget (e.g., 244 and 254) may be registered in a central configuration service, such as plugin registry 260. By registering plugins and widgets in plugin registry 260, and by defining plugins as a configuration and a plurality of user interface widgets, different versions of a cross-platform application may be supported by various platforms (e.g., various combinations of types of devices and operating systems). For example, an application deployed via web shell 220 and/or native desktop shell 230 may integrate cross-platform user interface generation tools, JavaScript libraries, such as Dojo, JQuery, or Angular, and other technologies which can be leveraged to deploy a web-based version of a cross-platform user interface, regardless of whether the user interface is being deployed in a web browser or a native application that includes a web browser component. Similarly, an application deployed via mobile shell 210 may integrate cross-platform user interface generation tools, native code components (e.g., Java components for applications deployed on Android devices or Objective C components for applications deployed on mobile device operating systems, such as iOS, Android, Windows Mobile, at the like), and other technologies that can be leveraged to deploy a native mobile version of the cross-platform user interface.

Mobile shell 210 generally is an application that executes on a mobile device (e.g., a smartphone, handheld computer, or tablet computer) and integrates web-based user interfaces (UIs) and native mobile UIs to create a customized application that is tailored to the capabilities of the mobile device on which mobile shell 210 executes. To integrate web-based UIs and native mobile UIs, an instance of web shell 220 may be integrated into mobile shell 210 at runtime (not shown). UI components that are executed as a web component (e.g., web forms, hypertext markup language (HTML) UI elements, and the like) may be executed within the web shell 220. The mobile shell 210 can additionally leverage device-specific capabilities using native mobile UIs and code components. These device-specific capabilities may include, for example, integrated cameras for image capture and data extraction (e.g., of a tax form, a receipt, or other printed document with data to be ingested into an application), movement or location tracking devices (e.g., accelerometers, satellite positioning system (Global Positioning System (GPS), GLONASS, GALILEO, etc.) receivers or cellular-assisted satellite positioning systems), and other device-specific capabilities that widgets can leverage to perform actions related to an application hosted in the mobile shell 210.

The web shell 220 integrated into the mobile shell 210 can delegate one or more actions to the mobile shell 210 via a programmatic bridge, which allows for applications executed within the mobile shell 210 to be customized and optimized for different kinds of mobile devices. In one example, customization and optimization of an application executing in the mobile shell 210 may include the use of different image capture modules based on the capabilities of a mobile device on which the mobile shell 210 is executing. For lower-cost devices with slower processors, the image capture module executed in the mobile shell 210 may, at least in part, offload image processing to a cloud service or another computing device, while for higher-cost devices with more processing power, the image capture module executed in the mobile shell 210 may perform image processing and data extraction on the mobile device itself. In another example, the customization and optimization of an application executing in the mobile shell 210 may include customizations based on the screen size and screen resolution of the device on which the mobile shell 210 is executing. For a mobile shell 210 executing on a smartphone, navigation components may be hidden until requested by a user, while navigation components may be displayed in a mobile shell 210 executing on a mobile device having a larger screen (e.g., a tablet computer). In another example, a mobile shell 210 executing on a smartphone with a high-resolution screen (e.g., a QHD (2560 pixels by 1440 pixels), 4K (3840 pixels by 2160 pixels), or 8K (7680 pixels by 4320 pixels) screen) may receive user interface elements that are scaled for high-resolution screens, while a mobile shell 210 executing on a mobile phone with a lower-resolution screen (e.g., a 720p (1280 pixels by 720 pixels) or 1080p (1920 pixels by 1080 pixels) screen) may receive user interface elements that are scaled for lower-resolution screens.

Shells 210, 220, and 230 may host a variety of applications that share user interface components (e.g., widgets and plugins) to implement different functionality. To reduce the storage and memory footprint of an application hosted within a shell, shells 210, 220, and 230 may load widgets based on the application hosted within the shell. For example, a tax preparation application may load a first set of widgets (e.g., tax liability/refund calculators, a completeness engine, tax support modules, emotional response modules, and the like). An accounting application, on the other hand, may load a different set of widgets (e.g., credit/debit calculators, statement generators, and the like), as the functionality of the accounting application does not depend on the same widgets as the tax preparation application.

Generally, shells 210, 220, and 230 provide and implement a widget specification. The widget specification generally is a platform-neutral description of UI widgets. The widgets that are loaded into shells 210, 220, and 230 are generally not dependent on the specific implementation of a shell 210, 220, or 230. Rather, the widgets may depend on a sandbox application programming interface provided by a shell. For example, the web shell sandbox API 250 may be a common sandbox for all platform-agnostic widgets (i.e., cross-platform widgets). As illustrated in FIG. 2, mobile shell 210 exposes a mobile shell sandbox API 240 and a web shell sandbox API 250, while web shell 220 and native desktop shell 230 expose the web shell sandbox API 250. Sandbox APIs 240 and 250 may provide widgets with access to shell services, such as common capabilities, application context, authentication, and the like. Because the widgets depend on a sandbox API 240 and/or 250, widgets can be built with minimal dependencies, which allows the widgets to be embeddable into any application that is hosted within a shell 210, 220, or 230.

In some embodiments, application-specific monoliths (e.g., code for generating a user interface and application logic) may be decomposed into a plurality of widgets that may be hosted within a shell 210, 220, or 230. To allow for application-specific monoliths (or components of an application-specific monolith) to be executed within a shell 210, 220, or 230, the shells 210, 220, and 230 can execute an application-specific monolith or components of an application-specific monolith in a sandbox widget. The sandbox widget allows for the execution of legacy code within a shell 210, 220, or 230 that conforms to the functionality, calling conventions, and code execution rules enforced by sandbox APIs 240 and/or 250. The sandbox widget generally delegates tasks to legacy code that implements the application-specific monolith, but exposes the functionality of the widget in a manner that conforms to the code contracts established for communications between plugins and widgets in the shells. As application-specific monoliths are transitioned to widgets and plugins, usage of the sandbox implementation of application-specific monoliths may be discontinued.

Shells 210, 220, and 230 additionally provide mechanisms to enable widgets hosted within a shell 210, 220, or 230 to communicate with other widgets hosted in the shell. The communications mechanisms provided by a shell may provide for asynchronous communications between different widgets. These communications may be, in some cases, event driven (e.g., triggered when some condition occurs within an application hosted by a shell, such as user interaction with a graphical user interface element, expiration of a timer, etc.). In some cases, asynchronous communications between different widgets may be supported via communications channels between the widgets.

Shells 210, 220, and 230 may provide support for login, user authentication, and hydration of user interface widgets. For login and user authentication, shells 210, 220, and 230 may include modules for username/password authentication, biometric authentication, possession-based authentication, or a combination of authentication methods (multi-factor authentication). Biometric authentication modules may interact with a variety of authentication data capture devices on a client device, such as front-facing cameras on tablets or smartphones, web cameras on laptop or desktop computing devices, fingerprint readers, iris scanners, or other biometric devices for user authentication to allow for user enrollment and authentication.

Shells 210, 220, and 230 may be configured to support extensions. Support for extensions allows existing applications to add to the capabilities of the shells and customize shells for application-specific needs. For example, multiple hydration extensions may be made available for use in applications hosted within a shell 210, 220, or 230. These extensions may provide different mechanisms for mapping data into data objects for use in an application (or a portion of an application). By supporting extensions, shells 210, 220, and 230 further assist the transition from application code monoliths to applications that are dynamically created from a plurality of independently maintainable widgets and plugins, thereby simplifying software development and allowing for the rapid release of applications with consistent user experiences.

As illustrated, each shell 210, 220, and 230 includes a shell core 212, 222, 232, respectively, and a shell user interface 214, 224, 234, respectively. The shell cores 212, 222, 232 may include a shell kernel that manages the lifecycle of an application hosted within a shell 210, 220, or 230 and the user interface 214, 224, 234 rendered according to a device-specific user interface definition. Lifecycle management generally includes initialization of an application, termination of an application, deferring of actions, pausing of an application (e.g., when an application is minimized or otherwise placed in a suspended state), state recovery (e.g., when an application is maximized or otherwise reactivated from a suspended state), and the like. The shell cores 212, 222, 232, may further provide support for hydration, plugin/widget management, event handling, asynchronous communications, and shell extension and customization.

Shell user interfaces 214, 224, 234 render user interfaces dynamically based on client device information and the workflow that a user is executing. Shell user interfaces 214, 224, 234 provide layout and navigation management, flow control (e.g., to control the transition from one step to another step of a workflow implemented by an application hosted in shells 210, 220, or 230), user login/authentication, intra-application communications, and the like. Shell user interfaces 214, 224, 234 may be a barebones (or blank) user interface. Applications hosted within a shell 210, 220, or 230 can populate shell user interface 214, 224, 234 with the graphical user interface elements to be rendered to enable a user to perform one or more tasks. Applications using a shell user interface 214, 224, 234 generally define the user experience, which allows for application development teams of each shell UI to customize the user experience for the specific platform and application hosted within a corresponding shell 210, 220, or 230.

As illustrated, shell sandbox APIs 240 and 250 allow for execution of a variety of plugins and widgets. The specific plugins and widgets hosted in sandbox APIs 240 and 250 may be determined based on a type of device being used (e.g., native mobile widgets may be executed using mobile shell sandbox API 240, while web widgets may be executed using web shell sandbox API 250). As illustrated, mobile shell sandbox API 240 supports the execution of plugins 242, including one or more mobile widgets 244, a legacy mobile UI 246 (e.g., a UI associated with legacy code monoliths implemented as a widget that can be loaded into a shell 210, 220, and/or 230 of architecture 200), and third party mobile UIs 248 associated with extensions to one or more applications. Web shell sandbox API 250, which may be leveraged by any of mobile shell 210, web shell 220, and desktop shell 230 for the execution of web-based widgets, supports the execution of plugins 252, including one or more web widgets 254, a legacy web UI 256 associated with legacy code monoliths implemented as a widget that can be loaded into a shell 210, 220, and/or 230 of architecture 200, and third-party web UIs 258 associated with extensions to one or more web applications. Third party UIs 248 and 258 may be developed and deployed by other developers for integration into one or more software product offerings that may be executed within a shell 210, 220, or 230.

Shell sandbox APIs 240 and 250 may provide mobile widgets 242 and web-widgets 254 access to application utilities 280 and common capabilities. The application 280 utilities and common capabilities may be provided by a shell runtime. These utilities and common capabilities may include, for example, activity logging, analytics, authorization context tracking, application context tracking, and so on. The shell sandboxes 240 and 250 may provide a versioned public code contract that defines how consumers (i.e., different widgets and plugins, regardless of whether a widget or plugin is a first-party widget or plugin or a third-party widget or plugin) interact with the sandbox and the functionality exposed by shell sandbox APIs 240 250. At runtime, shells 210, 220, and 230 can create an instance of a sandbox and make the sandbox available to widgets at runtime, and the widgets loaded into a shell 210, 220, or 230 can access sandbox-provided services according to the versioned public code contract. In some aspects, the sandbox APIs 240, 250 may be extended by applications hosted in a shell 210, 220, or 230 to add application-specific features and behavior.

As discussed, application utilities 280 may be provided to widgets and plugins via one of shell sandbox APIs 240 or 250. In some cases, the utilities may include an application shell service 270, which manages initializing each shell by orchestrating between a plugin registry 260 and platform services for the relevant data to initialize the shell, which may be customized for a specific application and platform (e.g., for application X on mobile, on web, and on desktop/laptop computers). In some aspects, a mobile version of application shell service 270 may define a default configuration for initialization that may be packaged with a mobile application to optimize the performance of the mobile application.

Plugin registry service 260 represents a centrally managed service that manages the plugin configurations that may be used by applications hosted in shells 210, 220, 230 to provide customized user experiences. The plugin registry service 260 generally is responsible for delivering applicable configuration data for a specific application.

Figure 3:
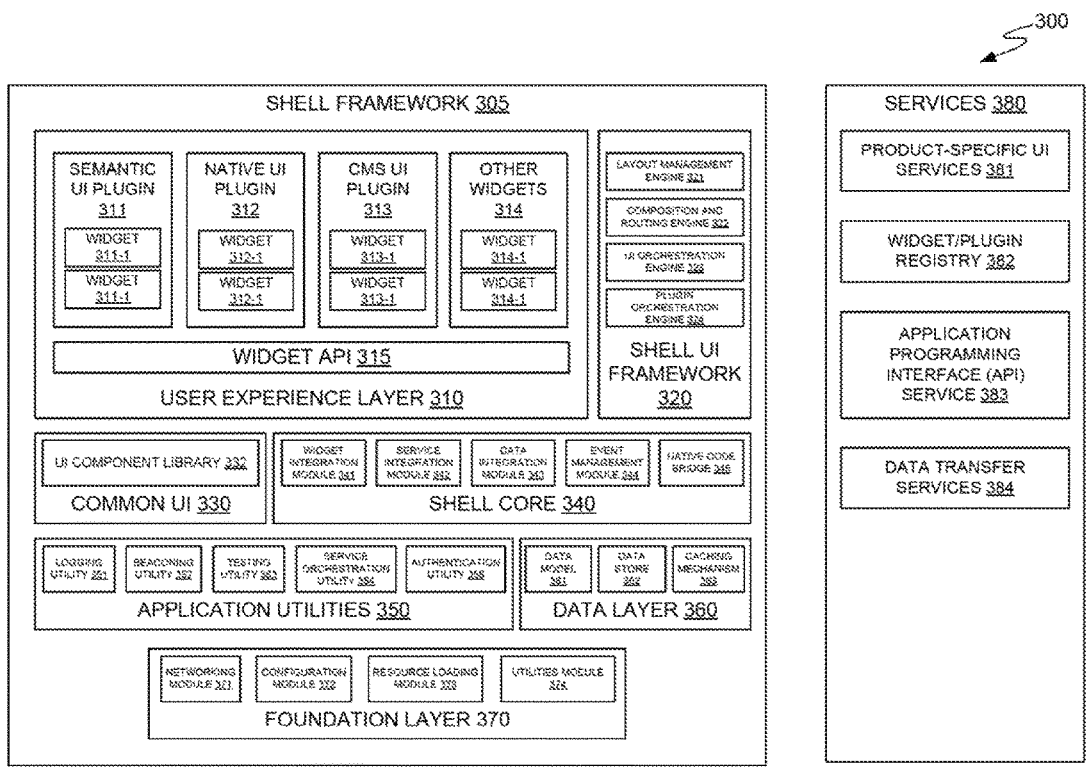
FIG. 3 illustrates an exemplary shell framework architecture for dynamically generating and deploying user interfaces to client devices executing a cross-platform application, according to one embodiment.

FIG. 3 illustrates an example shell architecture 300 for dynamically generating and deploying user interfaces in cross-platform applications. As illustrated, shell architecture 300 generally includes a shell framework 305 and services 380.

Shell framework 305 generally comprises a majority of the application code and provides the underlying architecture that enables the dynamic generation of user interfaces for applications based on user context, device information, and so on. As illustrated, shell framework 305 includes a user experience layer 310, a user interface framework 320, a common user interface layer 330, core services 340, application utilities 350, application data 360, and foundation layer 370.

User experience layer 310 generally hosts a plurality of plugins 311, 312, 313, 314 and a widget application programming interface (API) 315. Semantic UI plugin 311 generally hosts a plurality of cross-platform widgets 311-1. The cross-platform widgets 311-1 generally are widgets that may be rendered on a variety of computing devices (e.g., smartphones executing various operating systems, desktop computers, laptop computers, tablets, etc.) in either native application shells or a web shell executable within a web browser.

Native UI plugin 312 generally hosts a plurality of device-specific widgets 312-1 which may implement a variety of device-specific features.

Content Management System (CMS) UI plugin 313 generally hosts a plurality of widgets 313-1 that are used to implement a content management system within an application hosted within a shell. These CMS widgets 313-1, for example, provide document versioning, document tracking, and other services that can be used to manage documents uploaded and created by an application.

Other widgets 314 generally include, for example, widgets 314-1, which may include any additional widgets written using current technology or new technology that may be added over time.

Widget API 315 generally provides an interface to the various widgets hosted within the one or more plugins 311, 312, 313, 314 to allow the widgets to access one or more tools hosted in the shell core 340 and/or app utilities 350, access app data 360, or interact with device hardware through foundation layer 370.

Shell UI framework 320 generally implements one or more modules that aid in rendering a user interface on a device. As illustrated, shell UI framework 320 generally includes a layout management engine 321, composition and routing engine 322, UI orchestration engine 323, and plugin orchestration engine 324. Layout management engine 321 generally uses information in a device-specific user interface definition to determine an order in which plugins, widgets, and the associated user interface elements are displayed on a device. Composition and routing engine 322 generally renders the user interface on a device and instantiates one or more event handlers to route user interaction to the appropriate function or code module for processing. UI orchestration engine 323 is generally a data-driven engine that uses data input into an application to orchestrate events that are invoked within an application. Plugin orchestration engine 324 generally orchestrates communications between different plugins, as discussed above.

Common UI 330 generally includes common user interface components that are shared across different versions of a shell (i.e., shared across native mobile shell 210, web shell 220, and native desktop shell 230). As illustrated, common UI 330 includes a UI component library 332, which may include information defining the various shared user interface components that can be rendered on a device. A plugin can reference specific components defined in UI component library 332 in a definition of the visual layout or organization of the plugin. When shell UI framework 320 renders the plugin, shell UI framework 320 accesses UI component library 332 to obtain definitions of the common UI components and renders the plugin according to the obtained definition.

Shell core 340 generally hosts one or more modules that enable execution of applications within an application shell. As illustrated, shell core 340 includes a widget integration module 341, service integration module 342, data integration module 343, event manager 344, and a native code bridge 345.

Application utilities 350 generally include the common utilities leveraged by various applications during execution. These utilities may include, among others, a logging utility 351, a beaconing utility 352, testing utility 353, service orchestration utility 354, and authorization utility 355. These utilities may be implemented according to a code contract that is consistent across different shells (i.e., across native mobile shell 210, web shell 220, and native desktop shell 230) so that application utilities 350 work consistently across different platforms.

Application data layer 360 generally stores data models and user data at a local device and delivers the data to a remote source. Data model 361 generally defines relationships between data objects that are used within an application. The definitions may include the names of variables, data types, and other information that defines a data object and the interactions between different data objects. Data store 362 may be a relational or non-relational database that stores user data according to one or more of data models 361. Caching mechanism 363 may orchestrate the transmission of data to a remote source for commitment to a remote database.

Foundation layer 370 generally includes modules that interact with device hardware and define the low-level behavior of an application shell 305. As illustrated, foundation layer 370 includes a networking module 371, configuration module 372, resource loading module 373, and utilities module 374. Networking module 371 generally provides an interface through which an application executing within an application shell communicates with other computing devices. This interface may include, for example, functions that convert data into a bitstream that may be encapsulated into one or more packets for transmission to another device via a network interface, such as a wired interface, an 802.11 wireless interface, a cellular wireless interface, or other data transfer interfaces. Configuration module 372 generally configures the application shell 305 for execution on a specific device. Resource loading module 373 allows an application executing within an application shell to reserve resources (e.g., temporary and/or persistent memory, CPU time, etc.) on a device to allow for execution of the application. Utilities module 374 generally provides basic utilities that the application shell 305 uses for error recovery, memory management, and other purposes.

As discussed above, widgets and plugins hosted within an application shell 305 may interact with various services 380 through, for example, service integration module 342 in shell core 340. As illustrated, the services that support execution of applications within an application shell 305 may include product-specific UI services 381, a plugin repository 382, an application programming interface (API) service 383, and data transfer services 384. Product-specific UI services 381 generally provide product-specific user interface data to an application executing in application shell 305. As discussed in detail above, an application shell 305 can interact with plugin repository 382 to retrieve the appropriate version of a plugin and the widgets identified in a plugin definition for rendering on a user device. During execution of an application, the application may invoke one or more functions of a remote processing system represented by API service 383, which defines the functions that can be invoked by the application, the required and optional data inputs, and the type of data returned in response to the function call (if any). To invoke a function exposed by API service 383, a data transfer service 384 may provide a gateway between the application executing on a client device and the API service. The gateway may receive a request from a client device, generate and invoke a function call based on the received request, receive data from API service 383, and return the received data to the client device on which the application shell 305 is executing.

Example Browser-Based Shell for Executing a Cross-Platform Application

Figure 4:
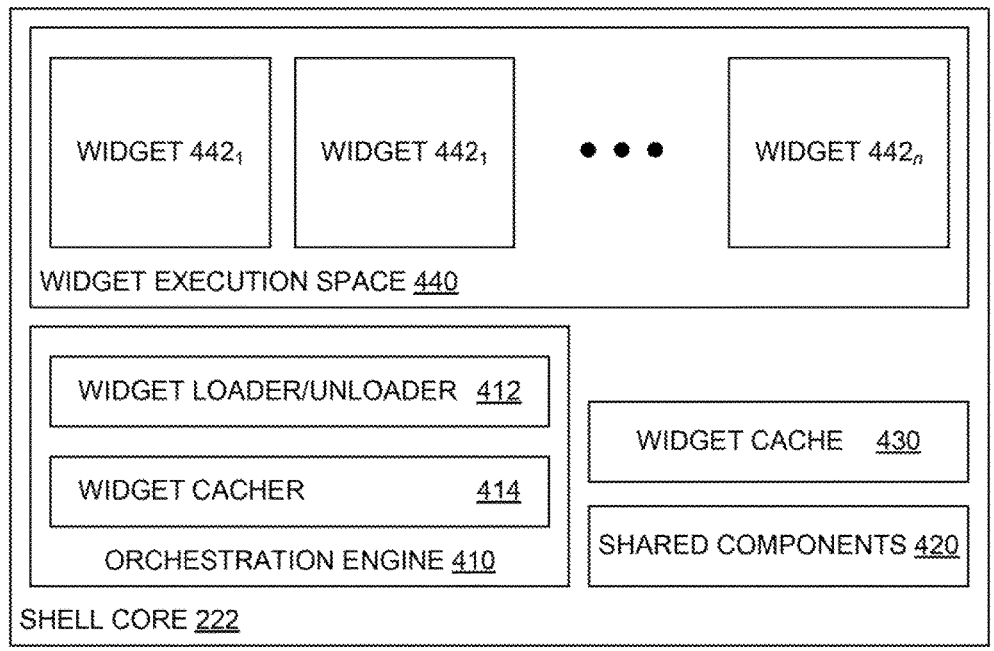
FIG. 4 illustrates an exemplary web shell core that instantiates components of a dynamically generated application according to received workflow definitions, according to one embodiment.

FIG. 4 illustrates an exemplary web shell core 222, according to an embodiment. Web shell core 222, as discussed above, generally provides shared components to be used by widgets loaded into a web shell 220 to communicate between widgets and to access other functionality common to the web shell 220, such as data logging, testing, authentication, and so on. As illustrated, web shell core 222 includes an orchestration engine 410, shared components 420, widget cache 430, and widget execution space 440.

Orchestration engine 410 generally receives a workflow definition from a server computer 130 and uses the workflow definition to obtain widgets 442 to be loaded into widget execution space 440. Once loaded, widgets 442 can be exposed to a user, via a user interface definition associated with each widget, to allow a user to interact with the step of a workflow. In some aspects, orchestration engine 410 may further receive information from server computer 130 identifying one or more widgets to pre-load into temporary memory (e.g., random access memory of a client device 120 on which web shell 220 executes) and/or information identifying one or more widgets to store in widget cache 430. The widgets identified to be pre-loaded into memory or to be loaded into widget cache 430, as discussed in further detail below, may be widgets that are likely to be included in one or more steps of a workflow executed by a dynamically generated application, as discussed in further detail below. Loading these widgets into temporary memory or widget cache 430 may accelerate the dynamic building of these applications, as orchestration engine 410 need not obtain the pre-loaded or cached widgets from a remote source Orchestration engine 410 includes a widget loader/unloader 412, which generally receives a workflow definition representing a step of a workflow executed by server computer 130, obtains the widgets 442 identified in the workflow definition, and loads the widgets 442 into widget execution space 440. A workflow definition generally identifies a plurality of widgets to load into widget execution space 440 by examining a list or collection of widgets included in the workflow definition. The widgets may be identified, for example, by strings including information about the name of a widget, the deployment platform targeted by a widget (e.g., web, platform agnostic (e.g., React, Java, etc.), native, etc.), version information, and other specific data about a widget.

For each widget identified in the workflow definition, widget loader/unloader 412 determines whether to obtain the widget from a remote source, such as widget repository 160 in FIG. 1, widget cache 430, or temporary memory in which a widget has been pre-loaded. Generally, loading a widget that has been pre-loaded in temporary memory (e.g., loaded into a volatile memory such as system random access memory) completes the loading process faster than loading a widget from a local cache (e.g., widgets stored temporarily in persistent storage on client device 120), as a widget stored in local cache may need to be initialized before being loaded into widget execution space 440. Loading a widget from a remote source may have a higher latency than either loading a widget from temporary memory or widget cache 430, as retrieval of a widget from a remote source may incur network latencies in transmitting a request for a widget and downloading the widget from the remote source.

To reduce the amount of time needed to load the widgets identified in a workflow definition (and correspondingly, to reduce the amount of time needed to instantiate a step in a workflow), widget loader/unloader 412 generally searches temporary memory on client device 120 and/or widget cache 430 for widgets identified in a workflow definition before requesting a widget from a remote source. In some aspects, shell core 222 may maintain searchable lists of widgets available on client device 120 (e.g., loaded into temporary memory and/or widget cache 430) to facilitate determining whether widget loader/unloader 412 is to load a widget from temporary memory, widget cache 430, or a remote source. The searchable list may be implemented in any suitable data structure, such as a searchable table, a linked list, an array, a hash table, and so on. If widget loader/unloader 412 determines that a widget is available locally on client device 120, widget loader/unloader 412 can load the widget into widget execution space 440 and expose a graphical user interface associated with the widget to a user of client device 120.

Otherwise, if widget loader/unloader 412 determines that a widget is not available on client device 120 (e.g., is not stored in widget cache 430 or is not pre-loaded into temporary memory at client device 120), widget loader/unloader 412 obtains the widget from a remote source. To obtain a widget from a remote source (e.g., widget repository 160 in FIG. 1), widget loader/unloader 412 transmits a request to the remote source to obtain the widget. The request generally includes information identifying the requested widget. In some embodiments, the information identifying the requested widget may include the name of the widget, which, as discussed above, may identify the widget or a function performed by the widget, the platform on which the widget executes, and a version of the widget to be retrieved from the remote source. In some embodiments, the information identifying the requested widget may include a hashed value representing the widget to be retrieved from the remote source. Generally, any data that identifies a specific widget to be retrieved from the remote source can be used to request the widget from the remote source. In response, widget loader/unloader 412 generally receives a widget definition corresponding to the requested widget from the remote source. Widget loader/unloader 412 loads the widget definition into widget execution space 440 and exposes a graphical user interface associated with the requested widget to a user of client device 120.

In some cases, widget loader/unloader 412 can determine that a previous version of a widget is available on client device 120, but that the workflow definition received from server computer 130 specifies a newer version of the widget. In response, widget loader/unloader 412 can obtain the newer version of the widget specified in the workflow definition from the remote source and load the newer version of the widget into widget execution space 440. If the widget was identified as a widget to pre-load in temporary memory, widget loader/unloader 412 can unload the previous version of the widget from temporary memory and load the newer version of the widget into temporary memory. If the previous version of the widget was stored in widget cache 430, widget loader/unloader 412 can instruct widget cacher 414 to replace the widget stored in widget cache 430 with the newer version of the widget obtained from the remote source.

Generally, as discussed above, a widget definition for a first widget 442 may include information identifying one or more widget dependencies, i.e., other widgets that are to be loaded into widget execution space 440 before the first widget can be loaded into the widget execution space. To load a first widget 442, widget loader/unloader 412 can examine a widget definition for the first widget 442 to obtain information specifying the widget dependencies for the first widget. For each widget dependency, widget loader/unloader 412 can examine widget execution space 440 to determine whether the widget dependency has already been loaded into widget execution space 440. If the widget dependency has been loaded into widget execution space 440, no further action need be taken with respect to that widget dependency. Otherwise, widget loader/unloader 412 loads the widget dependency from one of temporary memory, widget cache 430, or a remote source, as discussed above.

When a user initiates a transition to a requested step of a workflow (e.g., by clicking a "submit" or "next" button in a graphical user interface displayed on client device 120), widget loader/unloader 412 generally receives a second workflow definition specifying the widgets to be loaded into widget execution space 440 to allow a user to interact with the requested step of the workflow. In response, widget loader/unloader 412 generally unloads widgets associated with the previous step of the workflow from widget execution space 440 and loads widgets associated with the requested step of the workflow into widget execution space 440. In some embodiments, widget loader/unloader 412 can unload all of the widgets associated with the previous step of the workflow in widget execution space 440 and load the widgets associated with the requested step of the workflow (e.g., the widgets identified in the workflow definition for the requested step of the workflow) into widget execution space 440.

To accelerate transitions between different steps of a workflow, widget loader/unloader 412 can select widgets 442 to unload from widget execution 440 such that widgets that are shared between the previous step of the workflow and the next step of the workflow remain loaded in widget execution space 440. To identify widgets 442 to unload from widget execution space 440, widget loader/unloader 412 can generate a difference report from the workflow definition for the previous step of the workflow and the requested step of the workflow. Widgets that are included in both workflow definitions may be retained in widget execution space 440. Widget loader/unloader 412 generally unloads the widgets 442 from widget execution space 440 that are included in the workflow definition for the previous step of the workflow. To unload widgets 442 from widget execution space 440, widget loader/unloader 412 can, for example, invoke one or more destructor functions to mark the memory space allocated to the widgets to be unloaded 442 as available for use. In some embodiments, widget loader/unloader 412 may periodically perform garbage collection on widget execution space 440 to complete the deallocation process and release memory allocated to widgets 442 that have been unloaded from widget execution space 440. In some embodiments, widget loader/unloader 412 can remove a widget 442 from widget execution space 440, but retain the widget in temporary memory. Widgets may be retained in temporary memory, for example, where widgets are identified in a list of widgets to be pre-loaded into shell core 222, as discussed above, such that commonly used widgets can be loaded into widget execution space 440 without obtaining the widget definition from a remote source. Widget loader/unloader 412 can obtain widget definitions from one or more of a temporary memory, a widget cache 430, or a remote source (e.g., widget repository 160 in FIG. 1) for the widgets identified in the workflow definition for the requested step of the workflow that are not already loaded into widget execution space 440. Thereafter, widget loader/unloader 412 may load the requested widgets into widget execution space 440.

In some embodiments, widget loader/unloader 412 may be able to determine, for example, based on a workflow specification, a process graph, or similar data, if a transition from a first step in a workflow to a second step in the workflow is a temporary transition (i.e., that the workflow will eventually return to the first step of the workflow). In some embodiments, a temporary transition may include a transition from the first step in the workflow to the second step in the workflow that returns to the first step in the workflow within a threshold number of steps (e.g., as represented by different steps in a workflow specification or a process graph). For example, if the workflow specification, process graph, or similar data indicates that the workflow will return to the first step within n steps (or some threshold amount of time $t_{thresh}$), the transition may be considered a temporary transition. If the transition from the first step to the second step in the workflow is a temporary transition, widget loader/unloader 412 need not deallocate memory allocated to the widgets included in the first workflow. In some embodiments, widget loader/unloader 412 may remove the widgets included in the first step of the workflow from the widget execution space 440 but retain the widgets included in the first step of the workflow in temporary memory to accelerate the process of re-loading the first step of the workflow, as needed. Thus, the widgets included in the first step of the workflow may be stored in temporary memory and may be hidden a user interacting with an application on client device 120 until the workflow returns to the first step, at which point widget loader/unloader 412 may retrieve the widgets associated with the first step of the workflow from temporary memory and load the widgets back into widget execution space 440 without incurring the latencies involved in reloading the widgets from widget cache 430 or a remote source.

Widget cacher 414 generally monitors workflow definitions received from a gateway server 130 and/or application server 140 to identify widgets to be stored in widget cache 430. In some embodiments, widget cacher 414 maintains a running count of a number of times that a widget has been included in a workflow definition received from server computer 130. If the widget has been included in a workflow definition above a threshold frequency (e.g., a percentage of workflow definitions received from server computer 130, a number of workflow definitions received from server computer 130, etc.), widget cacher 414 can determine that the widget is commonly requested and should be stored in widget cache 430 to accelerate the loading of different steps of a workflow. Widget cacher 414 may additionally receive instructions from server computer 130 specifying widgets to store in widget cache 430. In response, widget cacher 414 can obtain definitions of the specified widgets from a remote source (e.g., widget repository 160 in FIG. 1) and store the obtained definitions in widget cache 430.

In some embodiments, orchestration engine 410 may manage the shared components 420 loaded into shell core 222. Similar to widgets, shared components 420 may be versioned, and new versions may periodically be released to fix bugs in previous versions of the shared components 420 or to add functionality to the shared components 420. The shared components 420 may include, for example: widget-to-widget communication interfaces through which a first widget 442₁ transmits messages to a second widget 442₂; data transfer interfaces for transferring data from one or more widgets 442 to gateway server 130 and/or application server 140; logging interfaces for committing activity data from a widget to a specified log location; and the like. When updated shared components are made available, gateway server 130 and/or application server 140 may transmit a message to orchestration engine 410 identifying the shared components to be updated. Orchestration engine 410 may pause the current state of the application executing within shell core 222, obtain the updated shared components, replace the identified shared components with the updated shared components 420, and resume execution of the application within shell core 222. Alternatively, orchestration engine 410 may wait until a current application executing within shell core 222 is terminated in order to update the shared components 420. In this way, orchestration engine 410 avoids any potential operating conflict with the updated shared components 420.

Widget cache 430 may comprise a temporary storage location in which copies of widget definitions may be stored. As discussed above, widget cacher 414 may store one or more widgets in widget cache 430 to accelerate the process of loading and executing application components in a dynamically generated application. In some embodiments, widget cache 430 may maintain a searchable list of widgets cached at widget cache 430 to facilitate determinations of whether widget loader/unloader 412 is to obtain a widget from widget cache 430 or from a remote source, as discussed above.

Widget execution space 440 generally provides a memory space in which widgets specified in a workflow step definition can be loaded and executed to allow a user to interact with an application on client device 120. Widgets 442 are generally loaded into widget execution space 440 by widget loader/unloader 412 when orchestration engine 410 receives a workflow definition identifying widgets that are part of a step of a workflow executing in application 122. Widgets 442 are generally unloaded from widget execution space 440 when a workflow transitions from a first step to a second step. To increase the speed of loading dynamically generated applications, widgets that are not present in a workflow definition associated with a second step of the workflow may be unloaded from widget execution space 440, while widgets that are present in workflow definitions associated with both the first and second steps of the workflow may be retained in widget execution space 440.

Figure 5:
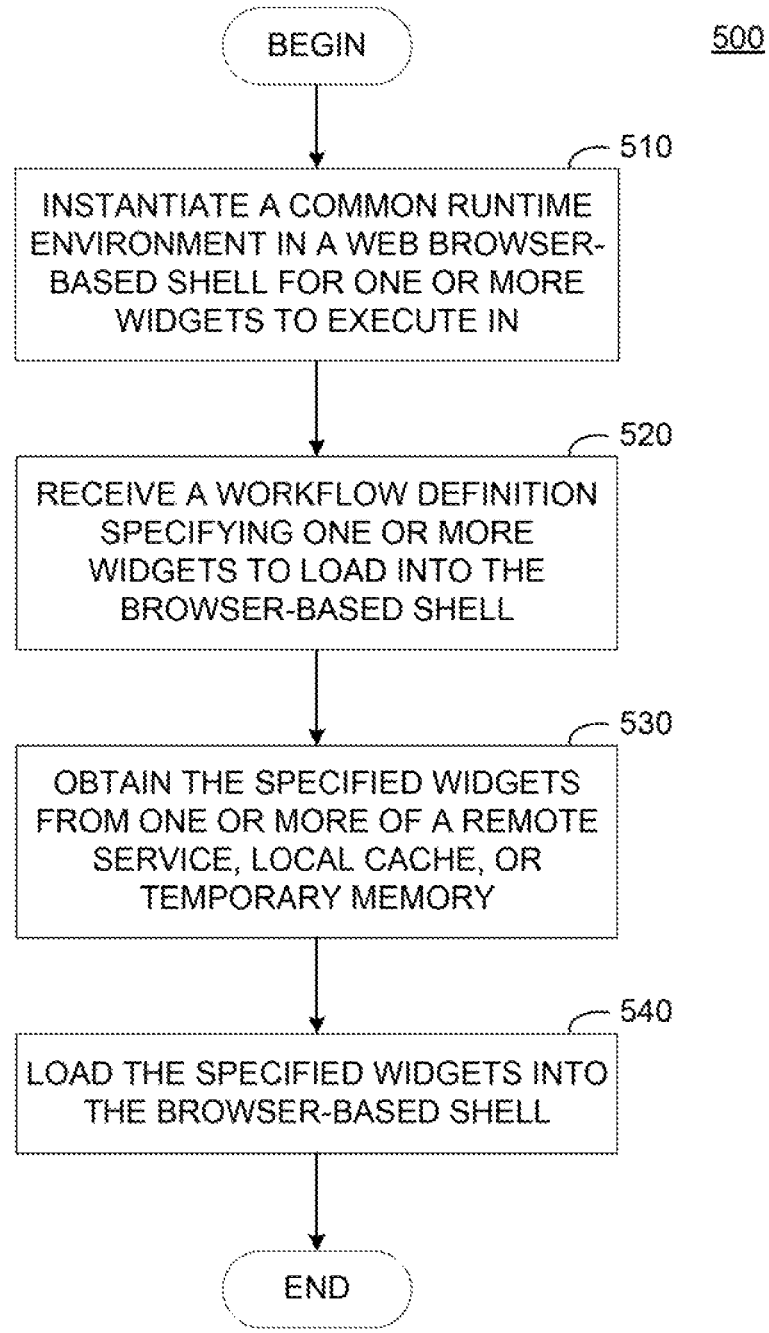
FIG. 5 illustrates exemplary operations for instantiating a web browser-based shell and a portion of a dynamically generated application executing in the web browser-based shell, according to one embodiment.

FIG. 5 illustrates exemplary operations that may be performed, for example, by an orchestration engine, such as orchestration engine 410 in FIG. 4, for executing a dynamically generated application in a browser-based shell, according to an embodiment. As illustrated, operations 500 begin at step 510, where orchestration engine instantiates a common runtime environment in a web browser-based shell in which one or more widgets are executed. As discussed, the common runtime environment may include a plurality of modules that expose shared functionality to the widgets loaded into the browser-based shell. These modules may include, for example: widget-to-widget messaging interfaces, which allow widgets to communicate with each other through the common runtime environment; data logging services; external communication interfaces through which widgets can transmit data to and receive data from remote servers, such as gateway server 130 and/or application server 140 in FIG. 1; and so on.

At step 520, orchestration engine receives a workflow definition specifying one or more widgets to load into the browser-based shell. The workflow definition may be received as a parseable data file, including data identifying specific widgets to be loaded into the browser-based shell. The identifying data may include, for example; the name of a widget, which may identify the functionality implemented or exposed by the widget; the execution platform targeted by the widget (e.g., web, React, other cross-platform frameworks executable in a browser, and so on); the version of the widget; and the like.

At step 530, orchestration engine obtains the specified widgets from one or more of a remote source, a local cache (e.g., from a local repository of widgets in a persistent storage on a client device), or a temporary memory (e.g., from a local random access memory at the client device in which one or more widgets is already loaded). Generally, orchestration engine attempts to obtain widgets from a local cache or temporary memory before requesting a widget definition from a remote source (e.g., widget repository 160). If orchestration engine finds a widget in a local cache or a temporary memory, orchestration engine need not request the widget from a remote source. By obtaining widgets from a local cache or temporary memory before requesting a widget from a remote source, loading widgets, unloading widgets, and rendering user interfaces for dynamically generated applications may be performed more quickly and with fewer computing resources expended. For these reasons and others, a device on which a web shell is executing may perform faster and utilize fewer processing and memory resources.

At step 540, orchestration engine loads the specified widgets into the browser-based shell. When the widgets are loaded into the browser-based shell, a user interface may be generated for display on a client device (such as client device 120 in FIG. 1) to allow a user of the client device to interact with the one or more widgets that constitute the workflow step defined in the received workflow definition.

Figure 6:
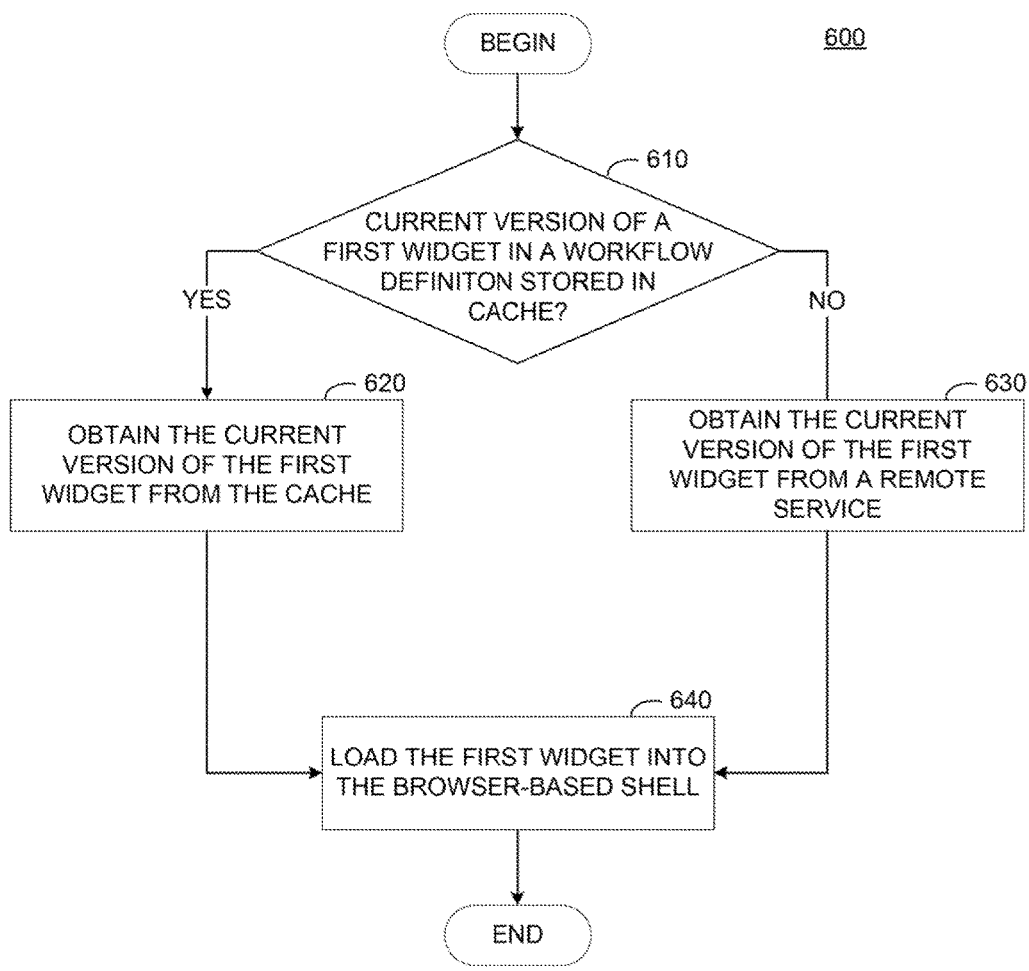
FIG. 6 illustrates example operations for obtaining a widget specified in a workflow definition to be loaded into a web browser-based shell in which a dynamically generated application executes, according to one embodiment.

FIG. 6 illustrates exemplary operations that may be performed by an orchestration engine, such as orchestration engine 410 in FIG. 4, to identify a location to obtain a widget to be loaded into a web browser-based shell, according to an embodiment. As illustrated, operations 600 begin at step 610, where orchestration engine determines whether the current version of a first widget specified in a workflow definition is stored in a cache, such as widget cache 430 in FIG. 4. To determine whether the current version of the first widget is stored in cache, orchestration engine generally compares version information for a widget received in a workflow definition to version information of a widget stored in the cache. In some embodiments, orchestration engine can compare hashes representing the first widget specified in a workflow definition to the corresponding copy of the widget in the cache. Because hashes representing a specific widget are generally static (i.e., result in the same hash generated for the same output), comparing hashes of a widget specified in a workflow definition and the corresponding widget in the cache may allow for a rapid determination of whether the first widget is stored in a cache, and, correspondingly, whether the orchestration engine should obtain an updated copy of the widget from a remote source.

If orchestration engine finds a matching entry in the cache, it may thereafter determine that the current version of the first widget is stored in the cache at step 610, and operations 600 proceed to step 620. At step 620, orchestration engine obtains the current version of the first widget from the cache.

If, at step 610, the orchestration engine determines that the current version of the first widget is not stored in the cache, then operations 600 proceed to step 630. At step 630, orchestration engine obtains the current version of the first widget from a remote source (e.g., widget repository 160 in FIG. 1).

Generally, to obtain the current version of the first widget from the remote source, orchestration engine transmits a request to the remote source identifying the requested widget (e.g., by a widget name, widget ID, or the like). In response, orchestration engine generally receives a copy of the first widget from the remote source. In some embodiments, where a previous version of the first widget is stored in the cache, orchestration engine may replace the previous version of the first widget with the received copy of the first widget in the cache and load the received copy of the first widget into temporary memory. If, however, a version of the widget has not been stored in cache, orchestration engine need not store the received copy of the first widget in cache.

At step 640, orchestration engine 410 loads the first widget into the browser-based shell. In some embodiments, orchestration engine 410 can load the first widget into the browser-based shell by referencing a memory address in temporary memory at which the copy of the first widget has been loaded. When the first widget is loaded into the browser-based shell, a user interface associated with the first widget may be displayed in an application (such as application 122 executing on client device 120 in FIG. 1), which generally allows a user to interact with the first widget and invoke the various functions exposed by the first widget.

Figure 7:
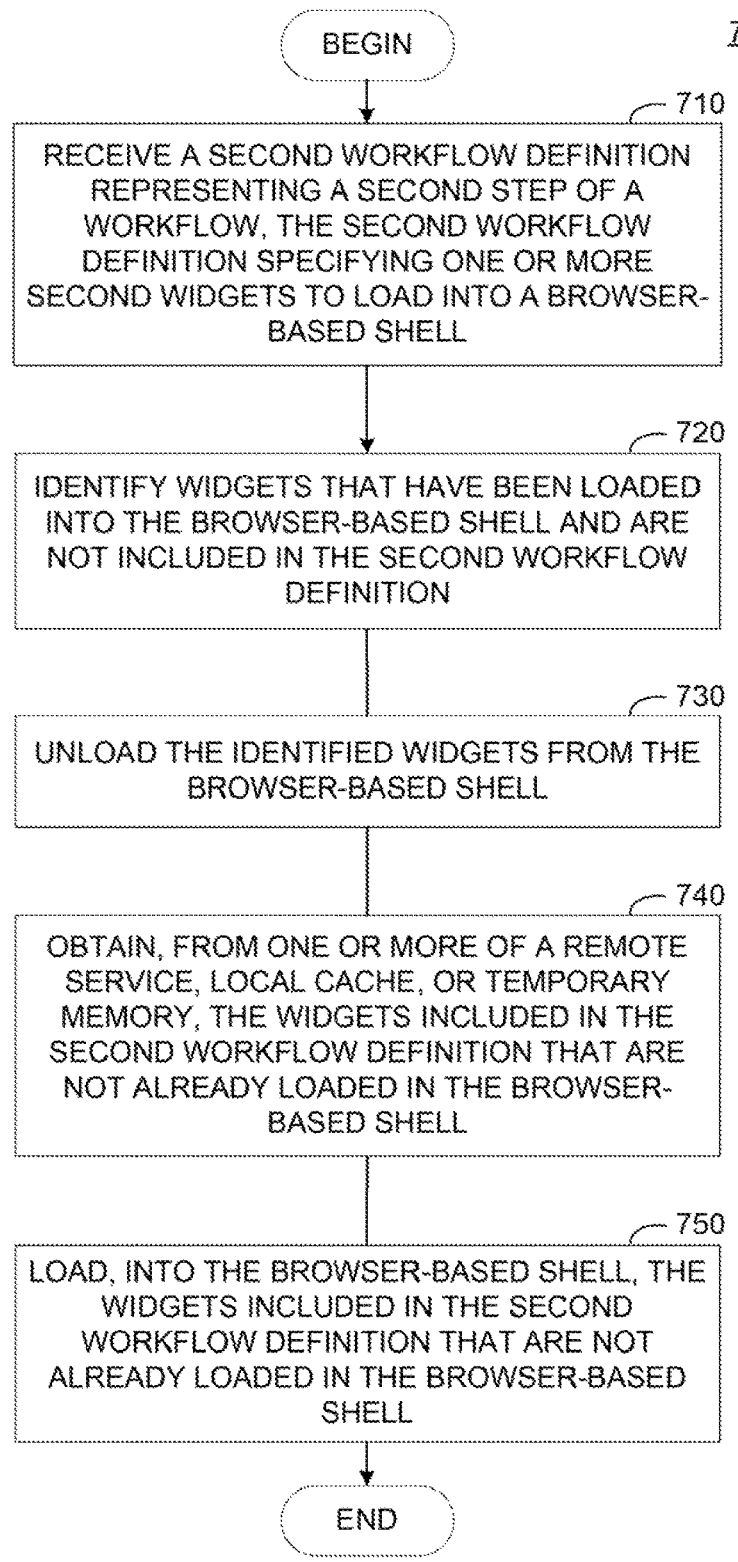
FIG. 7 illustrates example operations for transitioning between different steps of a workflow in a dynamically generated application, according to one embodiment.

FIG. 7 illustrates exemplary operations that may be performed, for example, by an orchestration engine, such as orchestration engine 410 in FIG. 4, to transition from a first step in a workflow to a second step in a workflow in a dynamically generated application executing in a web browser-based shell, according to an embodiment. As illustrated, operations 700 begin at step 710, where the orchestration engine receives a second workflow definition representing a second step of a workflow. The second workflow definition generally specifies one or more second widgets to load into a browser-based shell. As discussed above with respect to FIG. 5, the workflow definition may include information identifying the name, execution target, and version of each of a plurality of widgets to be loaded into the browser-based shell.

At step 720, orchestration engine 410 identifies the widgets that have been loaded into the browser-based shell and are not included in the second workflow definition. The identified widgets generally are widgets that are used in the first step of the workflow (represented by a first workflow definition) but are not used in the second step of the workflow (represented by the second workflow definition). Because these widgets are not used in the second step of the workflow, these widgets may be unloaded from the browser-based shell.

At step 730, where the identified widgets are unloaded from the browser-based shell. As discussed, to unload the identified widgets from the browser-based shell, orchestration engine 410 may invoke destructor methods on the identified widgets to mark the memory occupied by the identified widgets as available for use. In some embodiments, orchestration engine 410 may additionally invoke garbage collection routines to purge the identified widgets from temporary memory. In some embodiments, however, where an application will return to the first step of the workflow, the identified widgets may be unloaded from the browser-based shell but retained in temporary memory to accelerate the process of re-instantiating the first step of the workflow when the application returns to the first step of the workflow.

At step 740, orchestration engine obtains, from one or more of a remote source, local cache, or temporary memory, the widgets included in the second workflow definition that are not already loaded in the browser-based shell. As discussed above with respect to FIG. 5, orchestration engine generally attempts to obtain widgets from a local source (e.g., widgets pre-loaded into temporary memory or cached in widget cache) before obtaining widgets from a remote source in order to reduce latencies and accelerate the process of loading different steps of a workload in the browser-based shell. When orchestration engine determines that a widget has been pre-loaded into temporary memory, orchestration engine can obtain a reference to the widget, such as a starting memory address at which the widget can be found in temporary memory. If a widget has been cached at a widget cache, then orchestration engine can copy the widget to temporary memory. Where a widget is not available in local memory, orchestration engine requests a copy of the widget from a remote source (e.g., widget repository 160 in FIG. 1), as discussed above.

At step 750, orchestration engine loads, into the browser-based shell the widgets included in the second workflow definition that are not already loaded into the browser-based shell. When orchestration engine completes loading the widgets into the browser-based shell, the second step of the workflow may be made visible to a user of the client device, which allows the user to interact with and execute functions exposed by the second step of the workflow.

Figure 8:
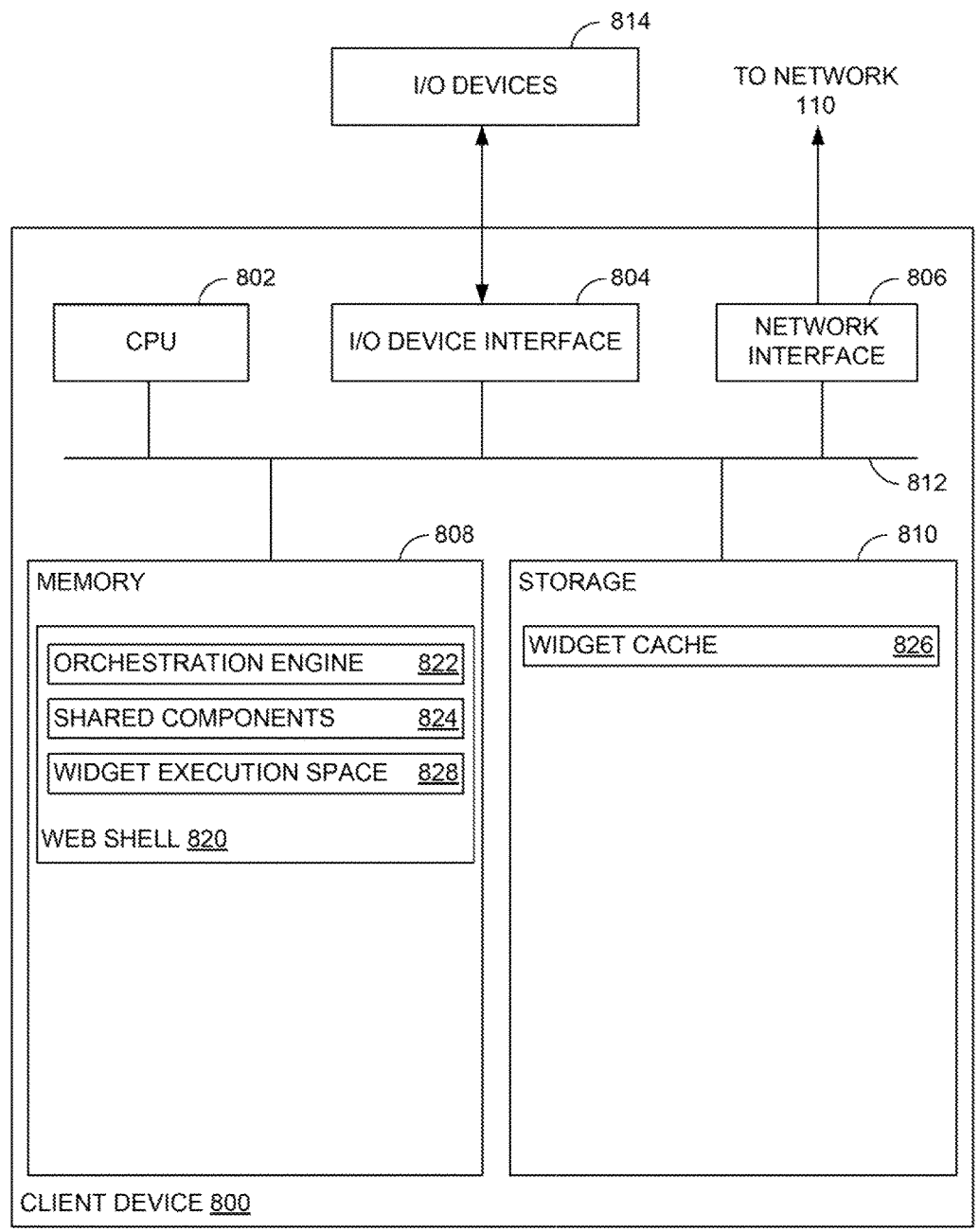
FIG. 8 illustrates an exemplary computing system for executing a dynamically generated cross-platform application in a web browser-based shell, according to one embodiment.

FIG. 8 illustrates a client device 800 that executes dynamically generated cross-platform applications in a web browser-based shell, according to an embodiment. As shown, the system 800 includes a central processing unit (CPU) 802, one or more I/O device interfaces 804 which may allow for the connection of various I/O devices 814 (e.g., keyboards, displays, mouse devices, pen input, etc.) to the system 800, network interface 806, a memory 808, storage 810, and an interconnect 812 (e.g., a bus).

CPU 802 may retrieve and execute programming instructions stored in the memory 808. Similarly, CPU 802 may retrieve and store application data residing in the memory 808. The interconnect 812 transmits programming instructions and application data, among the CPU 802, I/O device interface 804, network interface 806, memory 808, and storage 810. CPU 802 may comprise a single CPU, multiple CPUs, a single CPU having multiple processing cores, and the like. Additionally, memory 808 may comprise a random access memory. Furthermore, storage 810 may comprise a disk drive, solid state drive, or a collection of storage devices distributed across multiple storage systems. Although shown as a single unit, storage 810 may be a combination of fixed and/or removable storage devices, such as fixed disc drives, removable memory cards or optical storage, network attached storage (NAS), or a storage area-network (SAN).

As shown, memory 808 includes a web shell 820. Web shell 820 generally provides a runtime environment in which a web-based, dynamically generated, cross-platform application may be rendered and executed according to workflow definitions received from a remote source (e.g., gateway server 130 and/or application server 140 in FIG. 1, via network 110). As illustrated, web shell 820 generally includes an orchestration engine 822, shared components 824, and widget execution space 828.

Orchestration engine 822 generally assembles steps of a workflow in an application according to workflow definitions received from a server, such as gateway server 130 and/or application server 140 in FIG. 1. A workflow definition generally includes information specifying the one or more widgets to be loaded into widget execution space 828 and displayed to a user to allow for interaction with an application. When orchestration engine 822 receives a workflow definition, orchestration engine 822 identifies widgets to unload from widget execution space 828 by identifying widgets loaded in widget execution space 828 that are not included in the received workflow definition. Orchestration engine 822 may unload the identified widgets and load the widgets included in the received workflow definition that are not already loaded in widget execution space 828.

Orchestration engine 822 additionally manages the versions of shared components 824 loaded in web shell 820, widgets pre-loaded in memory 808 at client device 800, and widgets stored in widget cache 826 for rapid loading of widgets into widget execution space 828. Generally, orchestration engine 822 may receive messages from a remote server, such as gateway server 130 and/or application server 140 in FIG. 1, indicating that new versions of shared components 824 are available for download. Upon receiving this message, orchestration engine 822 can obtain the new versions of the shared components and replace the shared components 824 with the updated versions of the shared components that have been downloaded onto client device 800.

To manage widgets pre-loaded in local memory, orchestration engine 822 generally receives information from a remote server, such as gateway server 130 and/or application server 140 in FIG. 4, identifying one or more widgets to pre-load in memory. Orchestration engine 822 obtains the identified widgets from one or more of system random access memory, widget cache 826 or a remote source (e.g., widget repository 160 in FIG. 1) and loads the identified widgets into temporary memory. While these widgets may be loaded into temporary memory, orchestration engine 822 may defer loading these widgets into widget execution space 828 and exposing the widgets to a user until a widget definition including a pre-loaded widget is received.

Orchestration engine 822 additionally manages the widgets stored in widget cache 826 for rapid retrieval of widgets when assembling a dynamically generated application. In some embodiments, orchestration engine 822 can receive information from a remote server, such as from server computer 130 in FIG. 1, identifying widgets to be stored temporarily in widget cache 826. Based on the received information, orchestration engine 822 retrieves the widgets from a remote source (e.g., widget repository 160 in FIG. 1, via one or more messages exchanged over network 110) and stores the retrieved widgets in widget cache 826. In some embodiments, orchestration engine 822 monitors the received workflow definitions over time to identify widgets that are commonly included in different steps of a workflow. If a widget is not already stored in widget cache 828 and has been included in a workflow definition more than a threshold number of times, orchestration engine 822 can determine that the widget should be stored in widget cache 826. Orchestration engine 822, in response, can obtain the widget from a remote source, load the widget into widget execution space 828, and store the widget in widget cache 826 for future use.

Shared components 824 generally include one or more modules that provide common functionality to the widgets loaded into widget execution space 828, as discussed above.

Widget execution space 828 generally provides a memory space in which widgets specified in a workflow step definition can be loaded and executed to allow a user to interact with an application on client device 800. As discussed, widgets are generally loaded into widget execution space 828 by orchestration engine 822 in response to receiving a workflow definition identifying widgets that are part of a step of a workflow executing in a dynamically built application. Widgets are generally unloaded from widget execution space 828 when a workflow transitions from a first step to a second step. To increase the speed of loading dynamically generated applications, widgets that are not present in a workflow definition associated with a second step of the workflow may be unloaded from widget execution space 828, while widgets that are present in workflow definitions associated with both the first and second steps of the workflow may be retained in widget execution space 828.

As shown, storage 810 generally includes a widget cache 826. Widget cache 826 generally comprises a temporary storage location in which copies of widget definitions may be stored to accelerate the process of loading and executing application components in a dynamically generated application. In some embodiments, widget cache 826 may maintain a searchable list of widgets cached at widget cache 826 to facilitate determinations of whether orchestration engine 822 is to obtain a widget from widget cache 826 or from a remote source, as discussed above.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for executing a cross-platform application in a web browser-based shell, comprising:
instantiating one or more shared components in the browser-based shell, the one or more shared components exposing a common runtime environment to widgets loaded into the browser-based shell;
receiving, from an application server, a first workflow definition representing a first step of a workflow, and the first workflow definition specifying first widgets to be loaded into the browser-based shell, wherein the first widgets comprise modular components that each perform a function represented by the first step of the workflow, and wherein each widget comprises a user interface definition;
obtaining, from one or more of a remote source, a local cache, or a temporary memory, the first widgets;
loading, into the browser-based shell, the first widgets; and
generating a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

2. The method of claim 1, further comprising:
receiving, from the application server, information specifying a plurality of second widgets to load into temporary memory, wherein the information is received independently of a workflow definition;
obtaining, from the remote source, the plurality of second widgets; and
loading the plurality of second widgets into temporary memory.

3. The method of claim 1, wherein loading the first widgets into the browser-based shell comprises:
identifying, based on information defining a widget of the first widgets, one or more widget dependencies upon which execution of the widget depends;
loading, into the browser-based shell, widgets associated with the one or more widget dependencies; and
upon loading the widgets associated with the one or more widget dependencies, loading, into the browser-based shell, the widget.

4. The method of claim 1, wherein obtaining the first widgets comprises:
searching the local cache for a widget of the first widgets;
upon finding the widget in the local cache, loading the widget from the local cache; and
upon failing to find the widget in the local cache:
downloading, from the remote source, the widget; and
loading the widget into the browser-based shell.

5. The method of claim 4, wherein searching the local cache for the widget comprises:
requesting version information about the widget from the local cache;
determining that version information for the widget specified in the first workflow definition does not match version information for the widget stored in the local cache;
downloading, from the remote source, the version of the widget specified in the first workflow definition; and
replacing the widget in the local cache with the downloaded version of the widget.

6. The method of claim 1, further comprising:
for a widget of the first widgets, tracking a frequency in which the widget has been included in a plurality of workflow definitions received from the application server; and
upon determining that the frequency exceeds a threshold, storing a copy of the widget in the local cache.

7. The method of claim 1, further comprising:
receiving, from the application server, information identifying second widgets to be cached within the browser-based shell, wherein the information is received independently of a workflow definition;
obtaining, from the remote source, the second widgets; and
storing the second widgets in the local cache.

8. The method of claim 1, further comprising:
receiving, from an application server, a second workflow definition, the second workflow definition representing a second step of the workflow to be executed in the browser-based shell, and the second workflow definition specifying second widgets to be loaded into the browser-based shell;
identifying one or more of the second widgets to retrieve from at least one or more of the remote serve or the local cache based on differences between the first widgets loaded into the browser-based shell and the second widgets specified in the second workflow definition;
identifying one or more of the first widgets to retain in the browser-based shell, wherein the one or more of the first widgets comprise widgets included in both the first workflow definition and the second workflow definition;
obtaining, from one or more of the remote source or the local cache, the one or more of the second widgets; and
loading, into the browser-based shell, the one or more of the second widgets.

9. The method of claim 8, further comprising:
determining that the second workflow step will not return to the first workflow step within a threshold number of steps;
unloading the first widgets from the browser-based shell other than the one or more of the first widgets to retain in the browser-based shell; and
deallocating memory allocated to the first widgets other than the one or more of the first widgets to retain in the browser-based shell.

10. The method of claim 8, further comprising:
determining that the second workflow step will return to the first workflow step within a threshold number of steps;
unloading the first widgets from the browser-based shell other than the one or more of the first widgets to retain in the browser-based shell; and
moving the one or more of the first widgets to retain in the browser-based shell to the local cache for retrieval upon returning to the first workflow step.

11. The method of claim 1, further comprising:
receiving, from the application server, information indicating that an updated version of at least one of the shared components is available;
unloading the first widgets from the browser-based shell;
replacing the at least one of the shared components with the updated version of the at least one of the shared components; and
re-loading the first widgets into the browser-based shell.

12. A system, comprising:
a processor; and
a memory comprising instructions which, when executed by the processor, performs an operation for executing a cross-platform application in a web browser-based shell, the operation comprising:
instantiating one or more shared components in the browser-based shell, the one or more shared components exposing a common runtime environment to widgets loaded into the browser-based shell;
receiving, from an application server, a first workflow definition representing a first step of a workflow, and the first workflow definition specifying first widgets to be loaded into the browser-based shell, wherein the first widgets comprise modular components that each perform a function represented by the first step of the workflow, and wherein each widget comprises a user interface definition;
obtaining, from one or more of a remote source, a local cache, or a temporary memory, the first widgets;
loading, into the browser-based shell, the first widgets; and
generating a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

13. The system of claim 12, wherein the operation further comprises:
receiving, from the application server, information specifying a plurality of second widgets to load into temporary memory, wherein the information is received independently of a workflow definition;
obtaining, from the remote source, the plurality of second widgets; and
loading the plurality of second widgets into temporary memory.

14. The system of claim 12, wherein loading the first widgets into the browser-based shell comprises:
identifying, based on information defining a widget of the first widgets, one or more widget dependencies upon which execution of the widget depends;
loading, into the browser-based shell, widgets associated with the one or more widget dependencies; and
upon loading the widgets associated with the one or more widget dependencies, loading, into the browser-based shell, the widget.

15. The system of claim 12, wherein obtaining the first widgets comprises:
searching the local cache for a widget of the first widgets;
upon finding the widget in the local cache, loading the widget from the local cache; and
upon failing to find the widget in the local cache:
downloading, from the remote source, the widget; and
loading the widget into the browser-based shell.

16. The system of claim 12, wherein the operation further comprises:
for a widget of the first widgets, tracking a frequency in which the widget has been included in a plurality of workflow definitions received from the application server; and
upon determining that the frequency exceeds a threshold, storing a copy of the widget in the local cache.

17. The system of claim 12, wherein the operation further comprises:
receiving, from the application server, information identifying second widgets to be cached within the browser-based shell, wherein the information is received independently of a workflow definition;
obtaining, from the remote source, the second widgets; and
storing the second widgets in the local cache.

18. The system of claim 12, wherein the operation further comprises:
receiving, from an application server, a second workflow definition, the second workflow definition representing a second step of the workflow to be executed in the browser-based shell, and the second workflow definition specifying second widgets to be loaded into the browser-based shell;

identifying one or more of the second widgets to retrieve from at least one or more of the remote serve or the local cache based on differences between the first widgets loaded into the browser-based shell and the second widgets specified in the second workflow definition;

identifying one or more of the first widgets to retain in the browser-based shell, wherein the one or more of the first widgets comprise widgets included in both the first workflow definition and the second workflow definition;

obtaining, from one or more of the remote source or the local cache, the one or more of the second widgets; and loading, into the browser-based shell, the one or more of the second widgets.

19. The system of claim 12, wherein the operation further comprises:

receiving, from the application server, information indicating that an updated version of at least one of the shared components is available;

unloading the first widgets from the browser-based shell;

replacing the at least one of the shared components with the updated version of the at least one of the shared components; and re-loading the first widgets into the browser-based shell.

20. A system for executing a cross-platform application in a web browser-based shell, comprising:

a plurality of shared components that expose a common runtime environment to widgets loaded in the browser-based shell; and an orchestration engine configured to:

instantiate the one or more shared components;

receive, from an application server, a first workflow definition representing a first step of a workflow, and the first workflow definition specifying first widgets to be loaded into the browser-based shell, wherein the first widgets comprise modular components that each perform a function represented by the first step of the workflow, and wherein each widget comprises a user interface definition;

obtain, from one or more of a remote source, a local cache, or a temporary memory, the first widgets;

load, into the browser-based shell, the first widgets; and generate a user interface according to the first workflow definition, based on the user interface definition associated with each widget of the first widgets, wherein generating the user interface exposes the function represented by the first step of the workflow to a user which, when invoked by a user, initiates a transition to a second step of the workflow.

* * * * *